(No Model.)

C. FOSBY.
MEANS FOR STIFFENING CIRCULAR SAWS.

No. 601,773. Patented Apr. 5, 1898.

Witnesses:
R. P. Cohn
Alexander C. Connor

Inventor:
Charles Fosby,
by his attorney
Charles R. Searle

UNITED STATES PATENT OFFICE.

CHARLES FOSBY, OF RUTHERFORD, NEW JERSEY.

MEANS FOR STIFFENING CIRCULAR SAWS.

SPECIFICATION forming part of Letters Patent No. 601,773, dated April 5, 1898.

Application filed May 29, 1897. Serial No. 638,681. (No model.)

*To all whom it may concern:*

Be it known that I, CHARLES FOSBY, a citizen of the United States, residing at Rutherford, in the county of Bergen and State of New Jersey, have invented a certain new and useful Improvement in Means for Stiffening Circular Saws, of which the following is a specification.

The invention relates to devices by which circular plates may be reinforced, allowing the employment of a thinner saw-plate and effecting a corresponding saving in the material sawed and in the power required to drive the saw.
It consists in the application of a thin circular disk to each face of the saw, held in place on the revolving mandrel between the usual collar and nut thereon and extending as far toward the periphery of the saw as is practicable without entering the cut or kerf in the material sawed. The disks are slightly "dished," each to the same extent as the other, and are placed on the mandrel with the concave face against the saw-plate. They are then compressed by turning the nut until they are flattened and their faces are in close contact with the saw over the whole covered surface, thus increasing the frictional grip near the periphery where the strain is greatest, and also increasing the stiffness of the disks by holding them under strong tension against each other and the inclosed saw.

The accompanying drawings form a part of this specification and represent what I consider the best means of carrying out the invention.

Figure 1:
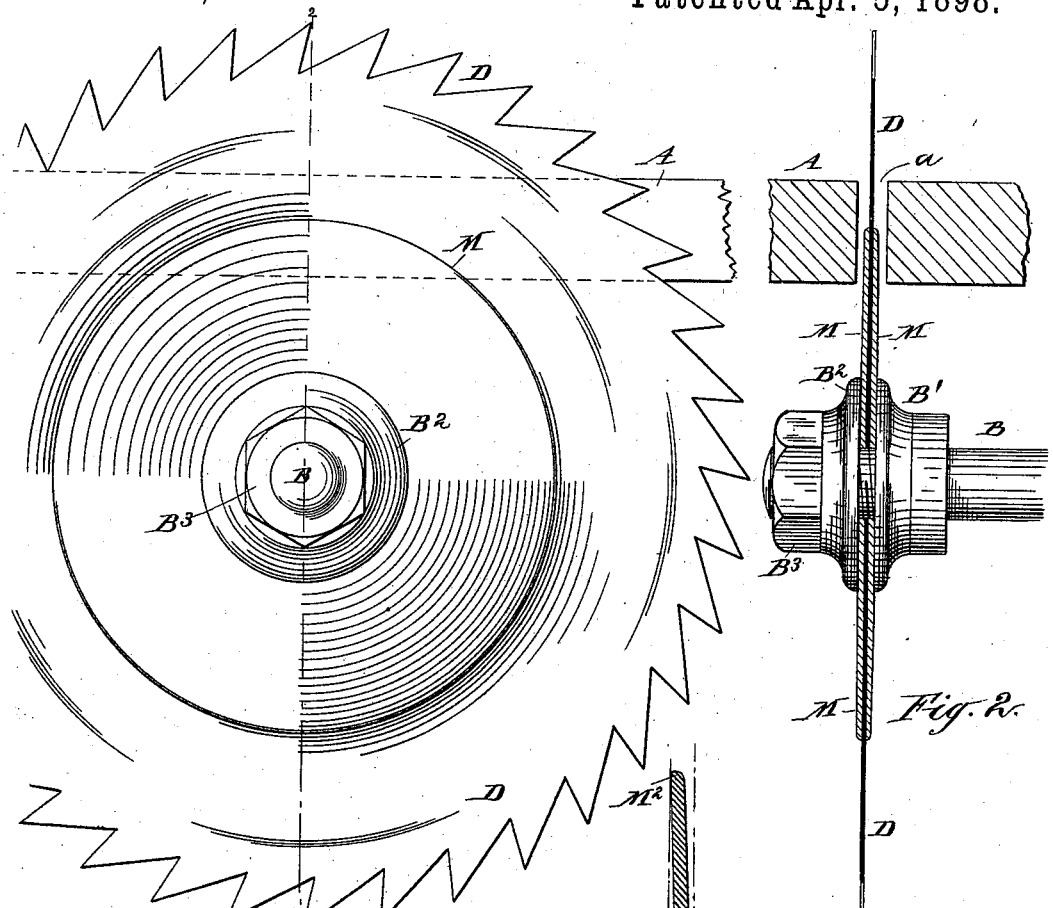
Figure 2:
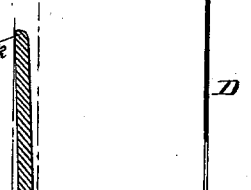
Figure 3:

Figure 1 is a face view of a circular saw mounted on its mandrel and equipped with my invention. Fig. 2 is a corresponding edge view, partly in vertical section, taken on the line 2 2 in Fig. 1. Fig. 3 is a diametrical cross-section through one of the disks on a larger scale.

Similar letters of reference indicate the same parts in all the figures.

A is a portion of the saw-table having the narrow slot $a$, through which the cutting portion of the saw projects and upon which the material to be sawed is supported.
B is the rapidly-revolving mandrel, driven by a belt and pulley, (not shown,) and B', B², and B³ are respectively the collar, washer, and nut by which the saw D is secured upon the mandrel, all of any ordinary or approved form and construction, excepting that the saw may be thinner than usual.

M M are the circular reinforcing-disks, of hardened steel, each having a central opening $m$, matching the mandrel. The diameter of the disk is less than that of the saw, leaving a sufficient portion of the latter to produce the desired depth of cut projecting above the table A. The material of the disk is thicker immediately surrounding the opening $m$, as indicated at M', and is thinned slightly toward the periphery M², and it is also dished a little, as shown in Fig. 3.

In applying the saw and disks the nut B³ and washer B² are removed and one of the disks is placed on the mandrel with its convex face against the collar B'. The saw is next applied, as usual, and followed by the second disk with its concave side next the saw. The washer and nut are then placed in position and the latter turned tightly home, flattening the disks and drawing their adjacent faces into close contact with the saw. It is important that the disks be exactly alike in thickness, degree of concavity, and temper, so that the tendency to spring the saw-plate in either direction will be exactly counteracted by the force of the other disk acting in the opposite direction, the result being that the saw is very stiffly supported and although comparatively thin is not deflected or dished in either direction.

I propose in practice to prepare several pairs of disks of differing diameters adapted for use on the same mandrel with differing sizes of saws or on the same saw conditioned to saw materials of varying thickness, so that the saw-plate may be supported in all cases as far toward the periphery as is practicable without permitting the disks to enter the saw-kerf.

The advantages attending the employment of a thin saw are obvious and have been briefly referred to above. One that is especially apparent is in resawing lumber previously brought to the desired thickness, but requiring to be reduced in width. The waste due to the saw-kerf is lessened by the thin saw, and the latter can be run with greater economy of power, or, stated in another way, a thin saw of larger diameter may be driven by the same power, developing a corresponding increase in peripheral speed and rapidity of cut. The thin saw-plate is held against "buckling," and a saw that has buckled in running without the disks may be drawn into the plane condition and again worked successfully by my invention.

Although I have described the disks as made of steel, it will be understood that other materials, as hard brass or cast-iron, may be used in their manufacture. Great care must be exercised in selecting the material to insure that the two comprising each pair shall be exactly alike in diameter, thickness, temper, and concavity.

The invention will serve with any of the ordinary makes of saws without requiring any change in their manufacture, and as the disks are entirely independent they may be easily removed and replaced and smaller or larger pairs substituted, as the character of the work to be performed may dictate.

I am aware that disks or washers hollowed on their inner faces have been before used with circular saws. Such were thick and practically inelastic, serving only to grasp the saw at a distance from the center and not lying in close contact over the whole covered surface.

I claim—

The saw A, mandrel B, and securing means B', B², B³, in combination with the disks M of less diameter than the saw, applied one on each face of the latter, and each having the central opening $m$ matching to and receiving said mandrel, the said disks being slightly concaved on the faces adjacent to the saw and corresponding each to the other in diameter, thickness, temper, and concavity, and flattened and compressed into close contact with said saw over the whole covered surface to maintain the saw in a true plane, all arranged to serve substantially as and for the purpose herein specified.

In testimony that I claim the invention above set forth I affix my signature in presence of two witnesses.

C. FOSBY.

Witnesses:
WM. H. STEVENS, Jr.,
EDW. A. HENCLEY.